(12) United States Patent
McAtarian et al.

(10) Patent No.: US 12,006,138 B2
(45) Date of Patent: Jun. 11, 2024

(54) INFLATABLE CONTAINMENT TANK

(71) Applicant: Andax Industries, L.L.C., Saint Marys, KS (US)

(72) Inventors: Patrick F. McAtarian, St. Marys, KS (US); Mark McAtarian, St. Marys, KS (US)

(73) Assignee: Andax Industries, L.L.C., Saint Marys, KS (US)

( * ) Notice: Subject to any disclaimer, the term of this patent is extended or adjusted under 35 U.S.C. 154(b) by 140 days.

(21) Appl. No.: 17/345,015

(22) Filed: Jun. 11, 2021

(65) Prior Publication Data
US 2022/0396423 A1    Dec. 15, 2022

(51) Int. Cl.
*B65D 90/24* (2006.01)
*B65D 88/16* (2006.01)

(52) U.S. Cl.
CPC ......... *B65D 90/24* (2013.01); *B65D 88/1656* (2013.01); *B65D 2588/162* (2013.01); *B65D 2590/24* (2013.01)

(58) Field of Classification Search
CPC .... B65D 88/706; B65D 88/703; B65D 88/16; E04B 1/169
USPC ........................................................ 220/571
See application file for complete search history.

(56) References Cited

U.S. PATENT DOCUMENTS

| | | | |
|---|---|---|---|
| 4,044,867 A * | 8/1977 | Fisher | A45C 7/004 383/3 |
| 5,620,018 A | 4/1997 | Carpenter et al. | |
| 11,072,479 B1 * | 7/2021 | David | B65D 81/052 |
| 11,199,020 B2 * | 12/2021 | Gendel | E02D 3/046 |
| 2010/0243649 A1 | 9/2010 | Zheng | |
| 2012/0291362 A1 * | 11/2012 | Milo | E04H 15/20 52/2.21 |
| 2014/0228745 A1 * | 8/2014 | Sharma | A61M 5/1409 604/82 |

OTHER PUBLICATIONS

Office Action for Canadian Application No. 3,160,005 (dated Dec. 19, 2023).

* cited by examiner

*Primary Examiner* — Anthony D Stashick
*Assistant Examiner* — Raven Collins
(74) *Attorney, Agent, or Firm* — Hovey Williams LLP

(57) ABSTRACT

A rapid deployment containment tank includes an inflatable container and a self-contained compressed gas source. The container defines a liquid chamber and an open top through which a liquid passes into the liquid chamber. The container is shiftable between a deflated configuration and an inflated configuration. The container includes a flexible base wall and a flexible sidewall cooperating to define the liquid chamber. The sidewall projects from the base wall along an interface and includes an air chamber. The air chamber includes a plurality of tubular columns spaced apart along the interface. The compressed gas source is coupled to the container and is fluidly connected to the air chamber to supply a compressed gas for inflating the container. The tubular columns are fillable with the compressed gas to cause the sidewall to lift upwardly from the base wall, as the container shifts from the deflated configuration to the inflated configuration.

14 Claims, 8 Drawing Sheets

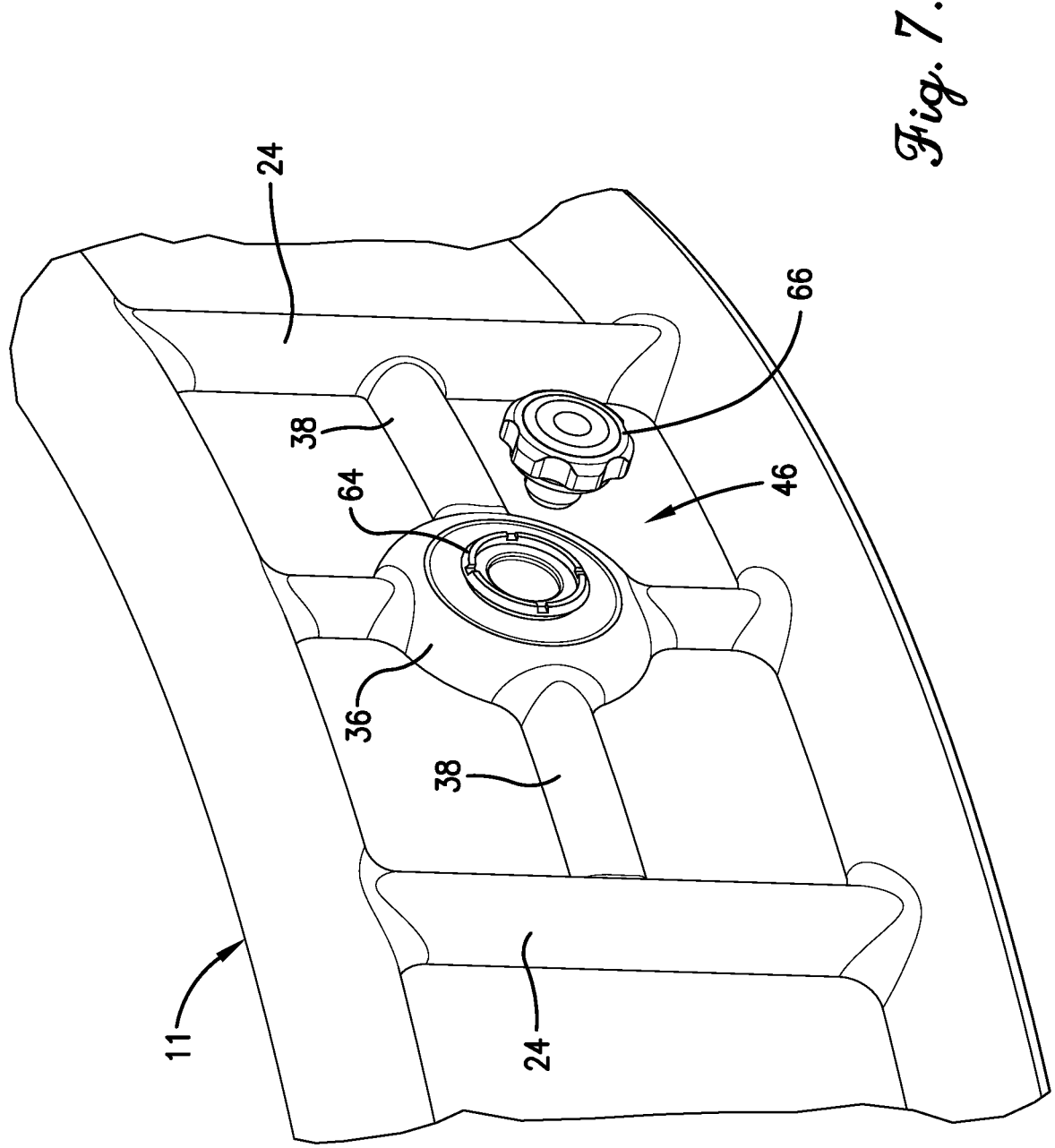

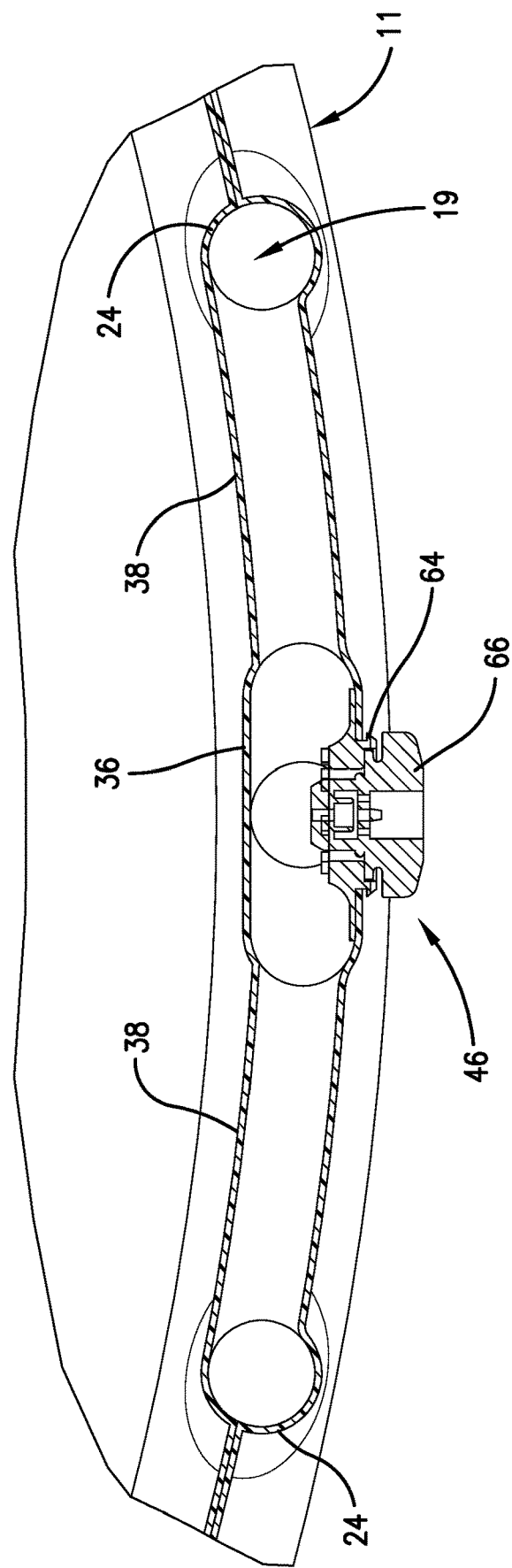

INFLATABLE CONTAINMENT TANK

FIELD OF THE DISCLOSURE

The embodiments described herein relate generally to an inflatable spill containment tank. More particularly, embodiments of the present invention relates to an inflatable rapid deployment spill containment tank particularly suitable for collecting and holding in place a leaking hazardous material.

BACKGROUND

At least some known containment tanks use a flexible liner with a support frame. The frame typically includes a kit of rigid frame members, typically formed from a lightweight metal, such as aluminum, which can be quickly assembled. The frame provides support to the flexible liner in a use configuration and then may be disassembled for storage and/or transport. Such containment tanks, however, cannot be deployed quickly enough in an emergency situation, such as where a vehicle has developed a leaking fuel tank, whereby quantities of gasoline or diesel fuel are spilled.

Some containment tanks utilize a floating collar attached to a flexible material in a bag-like form. Such tanks are commonly called floating collar tanks or onion tanks. Such tanks are generally self-supporting, frameless, collapsible, and collared. There are generally used for water relay for fire-fighting and military drinking water systems. Floating collar tanks, however, lack supporting sidewall structure for providing vertical lift of the collar. Rather, the collar floats on a liquid being used to fill the tank.

Other known containment tanks utilize spring steel rings and sidewall supports that are foldable to provide a portable containment tank. When the containment tank is placed on the ground, for example, the spring steel rings and sidewall supports, which are in a folded state, "spring" open to force the tank into its use configuration. Such tanks, however, contain several components that must be assembled and coupled together during manufacturing. This results in decreased efficiency of manufacturing and increased cost of the containment tank.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, a rapid deployment spill containment tank is presented. the containment tank is configured to collect a liquid spilling or leaking onto a surface. The containment tank includes an inflatable container defining a liquid chamber and an open top through which the liquid passes into the liquid chamber. The inflatable container is shiftable between a deflated configuration in which the inflatable container is collapsed into a compact size, and an inflated configuration in which the inflatable container is inflated to present the liquid chamber and the open top for receiving the liquid. The inflatable container includes a flexible base wall and a flexible sidewall cooperating to define at least in part the liquid chamber. The base wall is configured to be positioned and thereby supported on the surface when the inflatable container is in the inflated configuration. The sidewall projects from the base wall along an interface and includes an air chamber. The air chamber includes a plurality of tubular column portions spaced apart along the interface. The containment tank also includes a self-contained compressed gas source coupled to the inflatable container and fluidly connected to the air chamber to selectively supply a compressed gas for inflating the inflatable container. The tubular column portions of the air chamber are fillable with the compressed gas to cause the sidewall to lift upwardly from the base wall, as the inflatable container shifts from the deflated configuration to the inflated configuration.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 7 is an enlarged view of the containment tank of FIG. 1, illustrating a deflation assembly in exploded form; and FIG. 8 is an enlarged sectional view of the containment tank taken about line 8-8 shown in FIG. 2.

Figure 1:
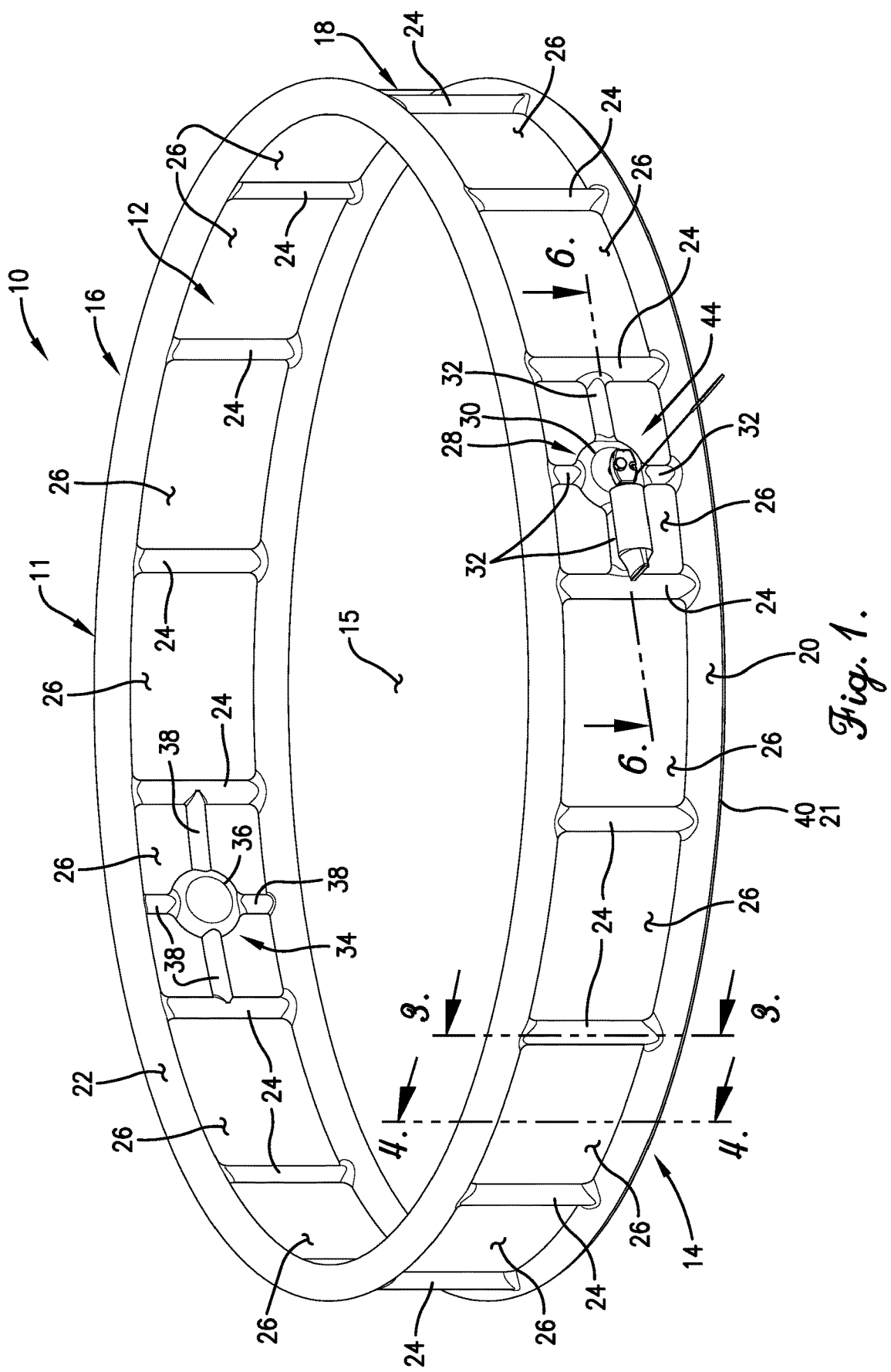
FIG. 1 is a front perspective view of an exemplary containment tank, in accordance with one aspect of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, directional references, such as, "top," "bottom," "front," "back," "side," "upward," "downward," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

EXEMPLARY CONTAINMENT TANK

Figure 2:
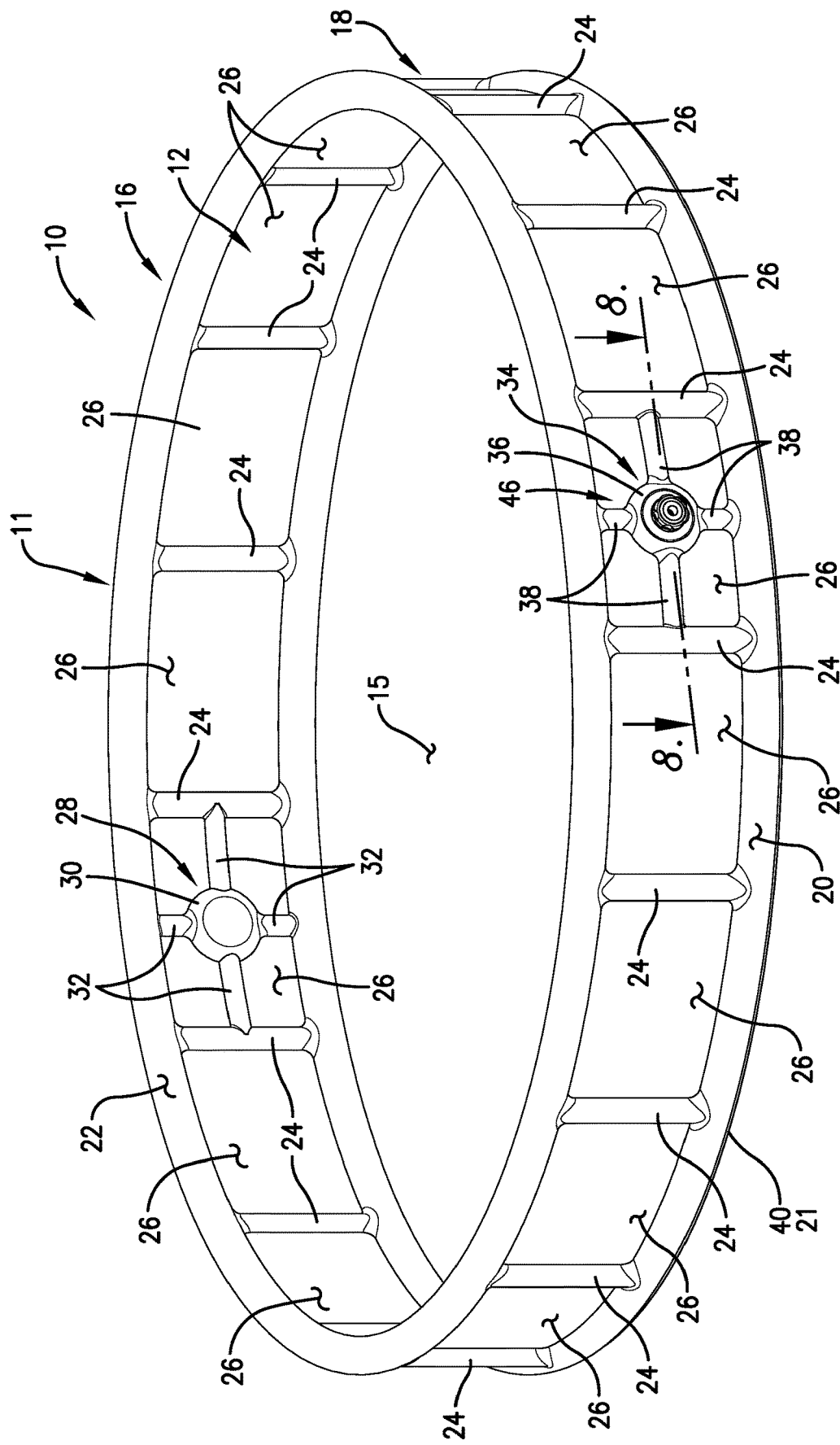
FIG. 2 is a rear perspective of the containment tank shown in FIG. 1.
Figure 3:
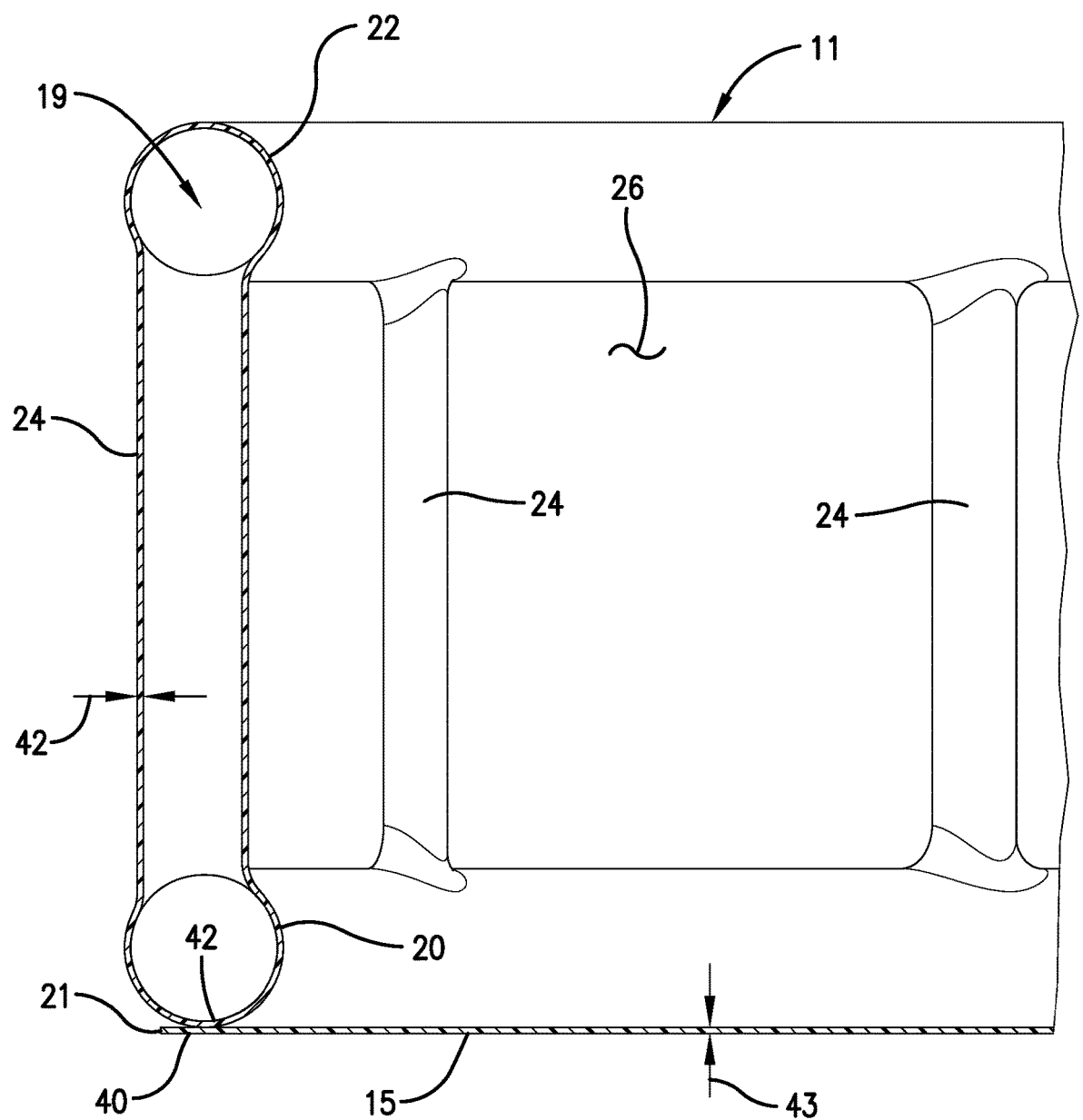
FIG. 3 is an enlarged section view of the containment tank taken along line 3-3 shown in FIG. 1.
Figure 4:
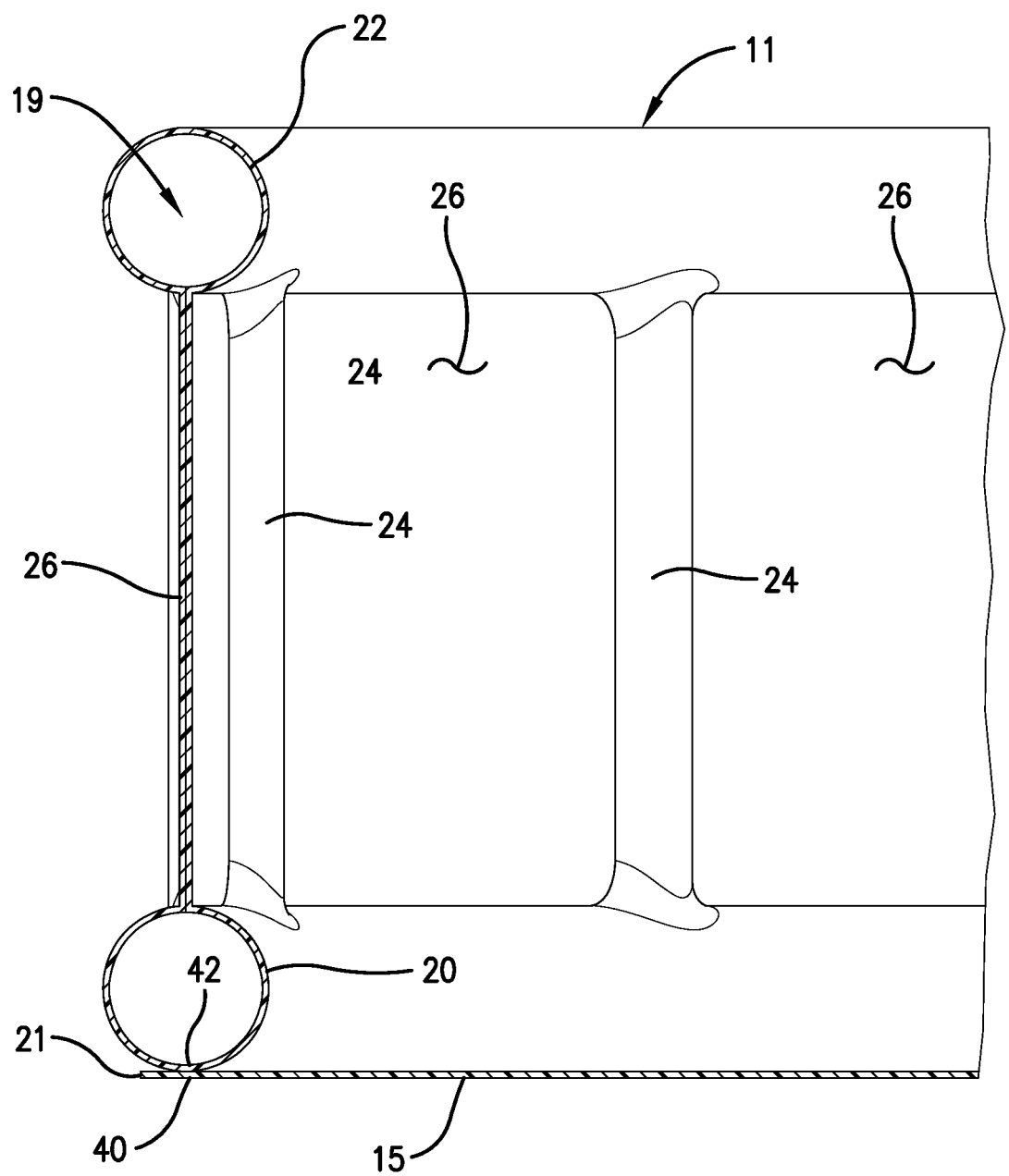
FIG. 4 is an enlarged section view of the containment tank taken along line 4-4 shown in FIG. 1.

FIG. 1 is a front perspective view of an inflatable, leak resistant, rapid deployment spill containment tank 10 depicted in an inflated configuration, in accordance with one aspect of the present invention. FIG. 2 is a rear perspective of the containment tank 10. FIG. 3 is an enlarged section view taken along line 3-3, shown in FIG. 1. FIG. 4 is an enlarged section view taken along line 4-4, shown in FIG. 1. In the exemplary embodiment, the containment tank 10 is substantially leak resistant and includes an inflatable container 11 having a liquid chamber 12 defined therein. The containment tank 10 is adapted to collect and hold a quantity of liquid, such as gasoline or diesel as discussed above, spilling or leaking onto a surface. The containment tank 10 is shiftable (i.e., configurable) between a deflated configuration in which the inflatable container 11 is collapsed into a compact size, and an inflated configuration in which the inflatable container 11 is inflated to present the liquid chamber 12 and an open top 16 for receiving the liquid. It is understood that certain aspects of the present invention contemplate the containment tank 10 being configured other than as illustrated herein.

The containment tank 10 may be fabricated from any suitable flexible film-like material such as, without limitation, urethane, polyurethane, polyvinyl chloride (PVC), polyvinyl chloride acetate (PVCA), vinyl, polyethylene, plastic, polyester fabric coated with plastic, a fabric coated urethane, rubberized nylon, polypropylene, rubber, neoprene, or other suitable thermoplastic materials, and/or any combination thereof. Such a flexible material enables the containment tank 10 to be folded into a compact size, when in a deflated configuration, for easy storage, for example in a vehicle (e.g., a truck). The containment tank 10 is in a deflated configuration when an air chamber 19 is substantially free of a compressed gas. Furthermore, as described herein, the material used to fabricate the containment tank 10 may include one or more of a woven or non-woven fabric therein. The containment tank 10 can also be made in any desired color or colors, and may be transparent, translucent, or opaque. As used herein, the term "air chamber" includes any structure configured to facilitate a flow of and/or at least partially and/or temporarily host a compressed gas, such as nitrogen, carbon-dioxide, air, and the like.

In the exemplary embodiment, the inflatable container 11 has a closed bottom 14, a generally cylindrical, flexible sidewall 18 defining an air chamber 19, and the open top 16 through which the liquid passes into the liquid chamber 12. The flexible sidewall 18 extends substantially vertically between the closed bottom 14 and the open top 16 when the air chamber 19 is inflated (i.e., in the inflated configuration), for example, with a compressed gas. In the exemplary embodiment, when in the inflated configuration, the sidewall 18 has a height in a range between and including about nine inches (9 in.) and about eleven inches (11 in.). However, in other aspects of the present invention, the sidewall height may include any alternative measures that enable the sidewall 18 to function as described herein.

The sidewall 18 includes an inflatable tubular base portion 20 and an inflatable tubular collar portion 22. In the exemplary embodiment, the air chamber 19 is defined by at least the base portion 20 and the collar portion 22. In certain other embodiments, the tubular base portion 20 and the tubular collar portion 22 may define separate or distinct air chambers.

In the exemplary embodiment, the base portion 20 and the collar portion 22 are continuous. In alternative embodiments, the one or more of the base portion 20 and the collar portion 22 may be other than continuous, including, for example, two (2) or more segments. In alternative embodiments, the collar portion 22 extends at least substantially along the open top 16. In other embodiments, however, the collar portion 22 may extend along only a portion or one or more portions of the open top 16. In the exemplary embodiment, the collar portion 22 has a peripheral size and shape substantially the same as the base portion 20. For example, in an alternative embodiment, the collar portion 22 may have a smaller diameter than the base portion 20. In yet other embodiments, the collar portion 22 may have a different peripheral size and/or shape than the base portion 20, without departing from the scope of this invention.

The closed bottom 14 is defined by a flexible base wall 15 configured to be positioned and thereby supported on a surface when the inflatable container 11 is in the inflated configuration. In the exemplary embodiment, the base wall 15 is sized and shaped to have a periphery substantially similar to the tubular base portion 20. Alternatively, the base wall 15 may have any size and shape that enables the containment tank to function as described herein.

In the exemplary embodiment, the bottom wall 15 has an outer perimeter 21 having a diameter in a range between and including about fifty-eight inches (58 in.) and about sixty-four inches (64 in.). However, in other aspects of the present invention, the bottom wall diameter may include any alternative measures that enable the base wall 15 to function as described herein. In addition, in some embodiments, the periphery of the base wall 15 may be shaped other than circular. The bottom wall has a substantially constant thickness 43 in a range between and including about five thousandths of an inch (0.005 in.) and about fifteen thousandths of an inch (0.015 in.). However, in other aspects of the present invention, the bottom wall thickness may include any alternative measures that enable the base wall 15 to function as described herein.

In an embodiment, the base wall 15 is coupled to the tubular base portion 20 along an interface 40, such that the tubular base portion 20 extends at least substantially along the interface 40. In this manner, the sidewall 18 projects from the base wall 15 along the interface 40. The interface 40 extends along the outer perimeter 21 of the base wall 15 and is defined by a seam that defines a leak proof seal or barrier configured to keep a liquid from passing therethrough. As such, the sidewall 18 and base wall 15 cooperate to define the liquid chamber 12. In certain aspects of the present invention, the tubular base portion 20 may extend along only a portion or one or more portions of the interface 40.

In one suitable embodiment, the base wall 15 is integrally formed with the tubular base portion 20. However, in a preferred embodiment, the base wall 15 is joined to the base portion 20 by a heat seal along the periphery or marginal edge of each respective component. A heat seal enables the materials to be permanently fused together using a combination of heat and pressure. When heat and pressure is applied to the interface 40, the materials of the base wall 15 and the tubular base portion 20 proximate the seam melt and fuse (or weld) to each other creating a leak proof seal. It is contemplated that the base wall 15 may be coupled to the tubular base portion 20 by any other means that enables the inflatable container 11 to function as described herein, such as via ultrasonic welding, adhesive, stitching, etc.

The sidewall 18 includes a plurality of alternately-spaced inflatable tubular column portions 24 and side panels 26. The tubular column portions 24 are spaced apart along the interface 40 and form or define part of the air chamber 19. Consequently, the tubular column portions 24 are configured to receive a compressed gas therein to cause the sidewall 18 to lift upwardly from the base wall 15, as the inflatable container 11 shifts from the deflated configuration to the inflated configuration. The illustrated side panels 26 are formed by two (2) or more parts or sections of the flexible film-like material of the sidewall 18 sealed in face-to-face contact, thereby substantially preventing gas passage therethrough. In the exemplary embodiment, the sidewall 18 includes sixteen (16) column portions 24 and side panels 26 alternately spaced about the periphery of the sidewall 18. It is contemplated, however, that the sidewall 18 may include any number of alternately-spaced tubular column portions 24 and side panels 26 that enables the inflatable container 11 to function as described herein.

In the exemplary embodiment, each of the column portions 24 and side panels 26 extend between the base portion 20 and the collar portion 22. Alternatively, the base portion 20 and/or the collar portion 22 may be positioned other than at the extremes of the column portions 24 and side panels 26. In the exemplary embodiment, the column portions 24 are coupled in fluid communication with one or more of the base portion 20 and the collar portion 22, and as such, the tubular base portion 20, column portions 24, and collar portion 22 cooperate to define a substantially hollow, inflatable support structure. Each respective side panel 26 extends between adjacent ones of the column portions 24 and the base portion 20 and collar portion 22. It is contemplated, however, that in certain aspects of the present invention, the tubular base portion 20, column portions 24, and collar portion 22 may intercommunicate to define two (2) or more distinct air chambers, and as such, need not all be in fluid communication with each other. Further, in the exemplary embodiment, the tubular column portions 24 are depicted as having substantially the same size and shape, being substantially linear and extending substantially vertical between the base portion 20 and the collar portion 22. It is contemplated, however, that in certain other aspects of the present inventions, the tubular column portions 24 may have different sizes and/or shapes, and may extend other than vertical. For example, one or more tubular column portions 24 may extend at an angle, be curvilinear, and/or being differently sized that other tubular column portions.

Optionally, in one example embodiment, one of the side panels 26 may include an inflation manifold 28 defined therein. In the exemplary embodiment, the inflation manifold forms or defines a portion of the air chamber 19 and includes an inflatable plenum 30 and one or more inflatable supply tubes 32. As depicted in FIG. 1, in the example embodiment, the plenum 30 is substantially centrally located in the respective side panel 26. The inflation manifold 28 includes four (4) supply tubes 32: one extending substantially vertically to the base portion 20; one extending substantially vertically to the collar portion 22; one extending substantially horizontally to a first respective column portion 24; and one extending substantially horizontally to a second respective column portion 24. The plenum 30 and supply tubes 32 are coupled in fluid communication to base portion 20, the collar portion 22, and the column portions 24 to supply a fluid, such as a gas, to the hollow support structure defined thereby. It is noted that in certain aspects of the present invention, the inflation manifold 28 may include fewer or more supply tubes. In addition, it is noted that the supply tubes may have different sizes and shapes, for example, to facilitate controlling a selected sequence of inflation of the base portion 20, collar portion 22, and/or the column portions 24.

Optionally, in one example embodiment, the sidewall 18 may include a deflation manifold 34, for example, defined in another respective side panel 26. In the depicted embodiment, the deflation manifold 34 is located in a side panel 26 substantially opposite the inflation manifold 28. That is, the deflation manifold 34 and the inflation manifold 28 are diametrically opposed in the generally cylindrical shaped sidewall 18 of the exemplary containment tank 10. The deflation manifold 34 is formed substantially similar to the inflation manifold 28 and forms or defines a portion of the air chamber 19. For example, the deflation manifold 34 includes an inflatable plenum 36 and four (4) inflatable supply tubes 38. The plenum 36 is substantially centrally located in the respective side panel 26. The deflation manifold 34 includes one supply tube 32 extending substantially vertically to the base portion 20; one extending substantially vertically to the collar portion 22; one extending substantially horizontally to a first respective column portion 24; and one extending substantially horizontally to a second respective column portion 24. The plenum 36 and supply tubes 38 are coupled in fluid communication to base portion 20, the collar portion 22, and the column portions 24 to remove a fluid, such as a gas, from the hollow support structure defined thereby. Note that the deflation manifold 34 may also be alternately constructed in accordance with certain aspects of the present invention.

In the exemplary embodiment, the containment tank 10 includes an inflation assembly 44 (broadly, a self-contained compressed gas source) and a deflation assembly 46, each coupled in fluid communication with the air chamber 19 of the inflatable container 11. As depicted in FIG. 1, the inflation assembly 44 is coupled to the sidewall 18, and more particularly, directly to the plenum 30 of the inflation manifold 28. Similarly, as depicted in FIG. 2, deflation assembly 46 is coupled to the sidewall 18, and more particularly, directly to the plenum 36 of the deflation manifold 34. While the inflation assembly 44 and the deflation assembly 46 are depicted as being coupled to the inflation manifold 28 and the deflation manifold 34, respectively, it is contemplated that the inflation assembly 44 and the deflation assembly 46 may be coupled to any of the base portion 20, collar portion 22, and/or column portions 24 to facilitate inflation and deflation of the sidewall 18, as described below.

As described above, the containment tank 10 is configurable between a deflated configuration and an inflated configuration. In one suitable embodiment, containment tank 10 may be folded into a rectangular prism shape of fourteen inches (14 in.) by sixteen inches (16 in.) by three and half inches (3.5 in.) or less. Thus, the containment tank 10 may be folded into a compact size having a deflated volume of seven hundred and eight-four cubic inches (784 in$^3$) or less. In the inflated configuration, the containment tank 10 may be expanded into a generally cylindrical shape having a diameter of about sixty inches (60 in.) and a height of about ten inches (10 in.). Thus, the containment tank 10 may be expanded (e.g., inflated) into a cylindrical shape defining an inflated volume of about twenty-eight thousand, two hundred and seventy-four cubic inches (28,274 in$^3$). Thus, a volumetric ratio of the deflated volume to the inflated volume is about 1:36.

Notably, the folded, deflated volume of the containment tank 10 is less than about five percent (5%) of the inflated volume occupied by the inflated containment tank 10. In certain embodiments, the deflated volume of the containment tank 10 is less than about three percent (3%) of the inflated volume occupied by the inflated containment tank 10. Advantageously, the containment tank 10 may be folded into the compact size for easy storage in a carrying case (not shown), which may be stowed in a vehicle (e.g., a truck), yet can suitably hold at least one hundred (100) gallons of fluid, but less than two hundred (200) gallons of fluid, within the liquid chamber 12 when in its inflated configuration. However, in other aspects of the present invention, the containment tank 10 may include any alternative measures that enable the containment tank 10 to function as described herein.

EXEMPLARY INFLATION ASSEMBLY

Figure 5:
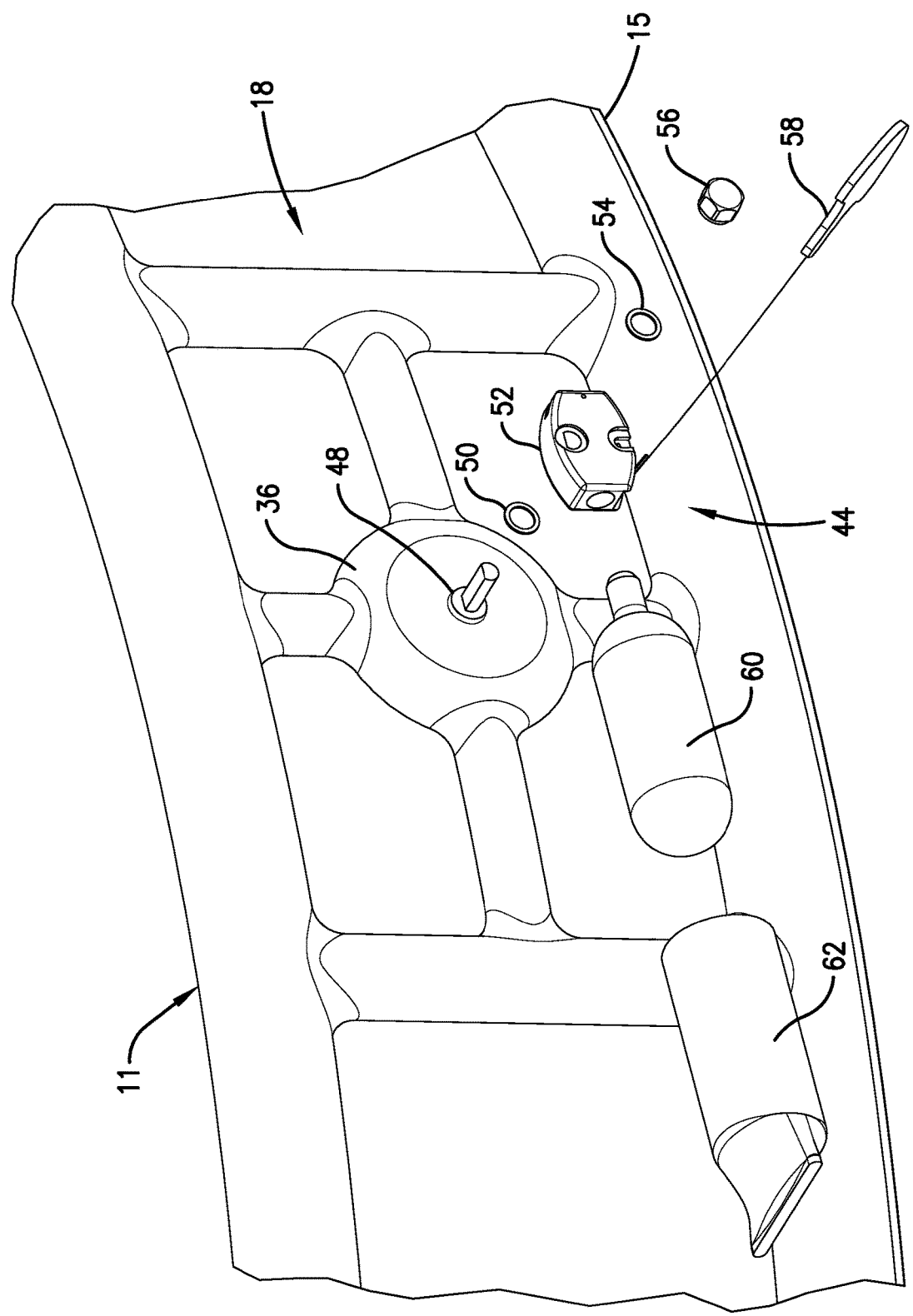
FIG. 5 is an enlarged view of the containment tank of FIG. 1, illustrating an inflation assembly in exploded form.
Figure 6:
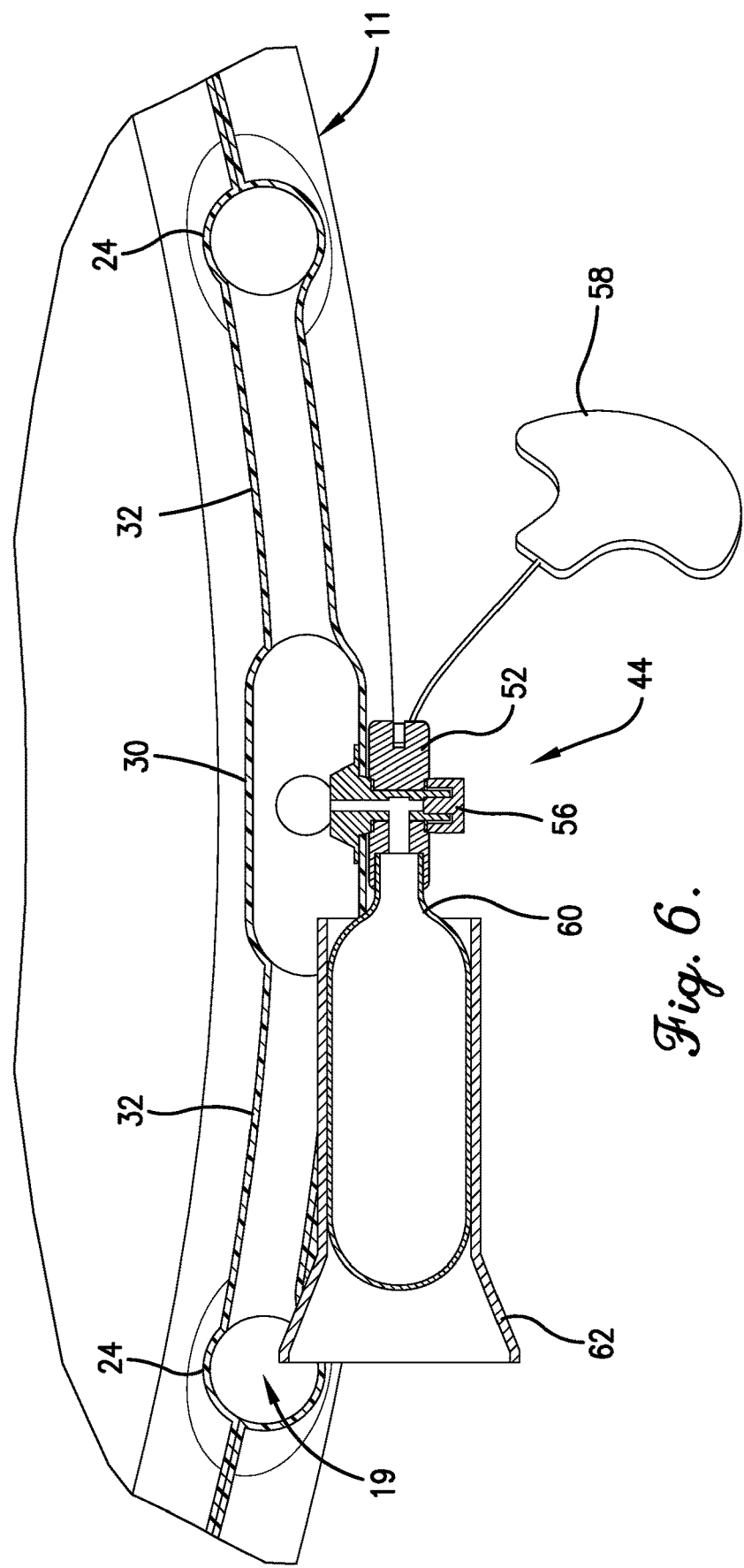
FIG. 6 is an enlarged sectional view of the containment tank taken about line 6-6 shown in FIG. 1.

FIG. 5 is an enlarged view of the containment tank 10, illustrating the inflation assembly 44 (i.e., the compressed gas source) in exploded form. FIG. 6 is an enlarged sectional view of the containment tank 10, taken about line 6-6 shown in FIG. 1. The inflation assembly 44 is supported on the sidewall 18 and includes any rapid inflation means known in art. In the exemplary embodiment, the inflation assembly 44 comprises a standard manual inflator assembly. One suitable inflation assembly is available as Product Numbers 830B08 and 840, manufactured by Halkey I Roberts®. (Halkey-Roberts is a registered trademark of Halkey-Roberts Corporation, 2700 Halkey-Roberts Place, N., St. Petersburg, Florida 33716). A manifold valve 48 is welded or fused (e.g., ultrasonic welding, heat sealing, adhesive bonding, stitching, etc.) to the sidewall 18 of the inflatable container 11 to enable a compressed gas (such as nitrogen, carbon-dioxide, air, etc.) to be introduced to the air chamber 19 therethrough. The manifold valve 48 is a one-way inflation valve, such as a check valve, non-return valve, reflux valve, retention valve, or one-way valve. The manifold valve 48 normally allows fluid (e.g., a liquid or gas) to flow through the valve in only one direction. That is, the manifold valve 48 allows a compressed gas to pass into the air chamber 19 of the sidewall 18 via the plenum 30, while preventing the gas from flowing back though the valve.

A first gasket 50 is positioned over the manifold valve 48. An inflator 52 is attached to the manifold valve 48, followed by a second gasket 54. A cap 56 is tightened to the manifold valve 48 to secure the inflator 52 thereto in a leak resistant connection.

The inflation assembly 44 includes a removeable, sealed compressed gas cartridge 60 and a cartridge sleeve 62. The cartridge 60 is configured to hold a compressed gas therein. In particular, the cartridge 60 is sized to hold a predetermined amount of compressed gas needed to inflate the air chamber 19 of the sidewall 18. In the exemplary embodiment, the cartridge 60 is standard thirty-eight gram (38 g) carbon-dioxide ($CO_2$) cannister. Alternatively, the cartridge 60 may be any size of cannister that enables the containment tank 10 to function as described herein.

The cartridge 60 is used in combination with the inflator 52 and manifold valve 48 to inflate the containment tank 10, and more particularly, the sidewall 18. For example, the inflator 52 is configured to selectively engage and unseal the cartridge 60 to channel the compressed gas from the cartridge 60 into the sidewall 18. The cartridge 60 is coupled to the inflator 52, as depicted in FIG. 6. The inflator 52 includes a cartridge receptacle (not shown) and a manual ripcord 58 for unsealing (i.e., activating) the cartridge 60 when pulled to inflate the sidewall 18.

EXEMPLARY DEFLATION ASSEMBLY

FIG. 7 is an enlarged view of the containment tank 10, illustrating the deflation assembly 46 in exploded form. FIG. 8 is an enlarged sectional view of the containment tank 10, taken about line 8-8 shown in FIG. 2. The deflation assembly 46 includes any rapid deflation means known in art. In the exemplary embodiment, the deflation assembly 46 comprises a standard release valve assembly (also referred to herein as a deflation valve assembly). One suitable deflation assembly is available as Product Numbers 03-601 and 03-474, manufactured by Halkey I Roberts®. A threaded plastic flange 64 is welded or fused (e.g., ultrasonic welding, heat sealing, adhesive bonding, stitching, etc.) to the sidewall 18 of the inflatable container 11 to enable a gas (such as nitrogen, carbon-dioxide, air, etc.) to be vented or released from the air chamber 19 therethrough. For example, the flange 64 is configured to allow a gas to pass out of the air chamber 19 of the sidewall 18, for example, via the plenum 36. A release valve 66 (or deflation valve) is threadably coupled (i.e., removably coupled) to the flange 64. The release valve may include a pressure release valve configured to control or limit the pressure in the air chamber 19, for example, by opening at a predetermined pressure to prevent bursting of the sidewall 18. For example, in the exemplary embodiment, the release valve 66 is configured to open at a nominal pressure of about 0.07 bar (approximately 1 psi).

EXAMPLE FABRICATION METHOD

In one embodiment, the sidewall 18 may be fabricated from a single blank of material having a substantially constant thickness 42. In the exemplary embodiment, the thickness 42 may be in a range between and including about five thousandths of an inch (0.005 in.) and about fifteen thousandths of an inch (0.015 in.). However, in other aspects of the present invention, the sidewall material thickness may include any alternative measures that enable the sidewall 18 to function as described herein. In an embodiment, the thickness 42 of the sidewall material may be substantially similar to the thickness 43 of the bottom wall. Alternatively, the thicknesses 42 and 43 may have different measures based in part, for example, on various selected design requirements for the containment tank 10.

The sidewall 18 may be fabricated by welding or fusing the manifold valve 48 and flange 64 in predefined locations, as described above. Fabrication may continue by folding a length of the sidewall material in half, onto itself. The two (2) sections overlap one another with their respective longitudinal edges (not shown) being aligned coincident with each other. The respective longitudinal edges may be coupled together by a heat seal along the entirety of the edges, defining a sidewall seam 42 (see FIGS. 3 and 4). The heat seal, as described above, enables the materials to be permanently fused together using a combination of heat and pressure to generate a leak resistant seal. The base portion 20, the collar portion 22, the column portions 24, and the manifolds 28, 34 are defined in areas of extra material, which is not fused or welded together. The side panels, however, are fused or welded together to. As such, the base portion 20, the collar portion 22, the column portions 24, and the manifolds 28, 34 may be inflated with a pressurized gas, whereas the side panels are sealed in face-to-face contact (e.g., because the sidewall is folded in half, onto itself), preventing gas passage therethrough.

It is contemplated that the sidewall 18 may be formed by any other means that enables the inflatable container 11 to function as described herein, such as via ultrasonic welding, adhesive, stitching, etc. The sealed sidewall material may be folded end-to-end, wherein the end edges (not shown) may be coupled together in a substantially similar manner as described above, for example, by a heat seal along the entirety of the edges. The base wall 15 may then be coupled to the sidewall 18, as described above.

OPERATION

In operation, the folded containment tank 10 may be removed from storage and placed proximate a site of a spilling or leaking fluid. The containment tank 10 is positioned with the closed bottom 14 facing downward and the open top 16 opening upward. A user grasps the manual ripcord 58 in one hand and pulls the ripcord to automatically inflate the containment tank 10. Upon activation of the cartridge 60, compressed gas is channeled from the cartridge 60, through the manifold valve 48, and into the sidewall 18. More particularly, the compressed gas is channeled into the inflation manifold 28 via the plenum 30. The gas expands through the supply tubes 32 into the base portion 20, the collar portion 22, and the tubular column portions 24.

As the gas expands into the base portion 20, the base portion 20 expands and facilitates extension of the base wall 15 inside the interface 40, as the inflatable container 11 shifts from the deflated configuration to the inflated configuration. Furthermore, the expansion of the gas into the tubular column portions 24 causes the sidewall 18 to lift upwardly from the base wall 15, as the inflatable container 11 shifts from the deflated configuration to the inflated configuration. Likewise, the expansion of the gas into the tubular collar portion 22 facilitates expansion of the sidewall 18.

The gas then fills the supply tube 38 and plenum 36 of the deflation manifold 34. As described above, in certain embodiments, the release valve 66 may be configured to release excess pressure automatically, keeping the sidewall 18 inflated while preventing bursting. As such, upon activating the inflator 52 to release the compressed gas from the cartridge 60, the containment tank 10 is rapidly inflated and ready for use with little effort exerted by the user. After use, the captured liquid may be properly disposed by the user. The release valve 66 may be removed from the flange 64 to allow all the gas to be released or vented from the sidewall 18. The cartridge 60 may be replaced with a new cylinder for subsequent inflation of the containment tank 10.

Advantageously, embodiments of the present invention provide for the rapid deployment of a spill containment tank for land-based spill collection. In particular, the present inventions provides for rapidly collecting and confining liquids leaking from a wide variety of different types of containers for a wide variety of situations and in a wide variety of surroundings. Although widely applicable, the present invention is particularly useful for large trucks and, specifically to truck fuel leaks. As discussed above, it is a common occurrence for trucks, whether involved in a traffic accident or not, to have problems with leaking fuel tanks whereby quantities of gasoline or diesel fuel are spilled. This invention provides an inflatable rapid deployment spill containment tank suitable for stowage on a truck.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodi-

The invention claimed is:

1. A rapid deployment spill containment tank to collect a liquid spilling or leaking onto a surface, said containment tank comprising:
    an inflatable container defining a liquid chamber and an open top through which the liquid passes into the liquid chamber,
    said inflatable container being shiftable between a deflated configuration in which the inflatable container is collapsed into a compact size, and an inflated configuration in which the inflatable container is inflated to present the liquid chamber and the open top for receiving the liquid,
    the inflatable container including—
        a flexible base wall and a flexible sidewall cooperating to define at least in part the liquid chamber,
        said base wall configured to be positioned and thereby supported on the surface, when the inflatable container is in the inflated configuration,
        said sidewall projecting from the base wall along an interface and including an air chamber,
        said base wall presenting an outer perimeter of the inflatable container;
        said sidewall including—
            a tubular base portion extending at least substantially along the interface,
            a tubular collar portion extending at least substantially along the open top,
            a plurality of tubular column portions spaced apart along the interface, each of said tubular column portions extending between and being fluidly coupled to the tubular base and collar portions,
            a first manifold that engages and connects to the base portion, the collar portion, and at least one of the tubular column portions, and
            a second manifold that engages and connects to the base portion, the collar portion, and at least one of the tubular column portions, said second manifold being positioned along the perimeter opposite the first manifold relative to the liquid chamber,
            said portions of the sidewall cooperating to at least in part to define the air chamber;
    a self-contained compressed gas source coupled to the first manifold to selectively supply a compressed gas for inflating the inflatable container; and
    a deflation valve assembly coupled to the second manifold,
    said tubular column portions of the sidewall being fillable with the compressed gas to cause the sidewall to lift upwardly from the base wall, as the inflatable container shifts from the deflated configuration to the inflated configuration.

2. The rapid deployment spill containment tank in accordance with claim 1,
    said interface being defined by a leak resistant seam along which the base wall and sidewall are joined.

3. The rapid deployment spill containment tank in accordance with claim 2,
    said seam extending along the outer perimeter.

4. The rapid deployment spill containment tank in accordance with claim 3,
    said outer perimeter being circular in shape,
    said sidewall being cylindrical.

5. The rapid deployment spill containment tank in accordance with claim 1,
    said tubular base portion of the sidewall being fillable with the compressed gas to facilitate extension of the base wall inside the interface, as the inflatable container shifts from the deflated configuration to the inflated configuration.

6. The rapid deployment spill containment tank in accordance with claim 5,
    said tubular collar portion of the sidewall being fillable with the compressed gas to facilitate expansion of the sidewall, as the inflatable container shifts from the deflated configuration to the inflated configuration.

7. The rapid deployment spill containment tank in accordance with claim 6,
    said base and collar portions of the sidewall each being continuous.

8. The rapid deployment spill containment tank in accordance with claim 1,
    said sidewall including a plurality of flexible side panels, each of which extends between the base and collar portions and is positioned between an adjacent pair of the tubular column portions.

9. The rapid deployment spill containment tank in accordance with claim 1,
    said liquid chamber having a volume of less than about two hundred gallons.

10. The rapid deployment spill containment tank in accordance with claim 9,
    said inflatable container having a deflated volume when in the deflated configuration and an inflated volume in the inflated configuration,
    said deflated volume being less than five percent of said inflated volume.

11. The rapid deployment spill containment tank in accordance with claim 1,
    said inflatable container being fabricated from a flexible film-like material comprising one or more of the following: a urethane, a polyurethane, a polyvinyl chloride (PVC), a polyvinyl chloride acetate (PVCA), a vinyl, a polyethylene, a plastic, a polyester fabric coated with plastic, a fabric coated urethane, a rubberized nylon, a polypropylene, a rubber, a neoprene, and any combination thereof.

12. The rapid deployment spill containment tank in accordance with claim 1,
    said compressed gas source including a sealed compressed gas cartridge containing the compressed gas,
    said compressed gas source including an inflator operable to selectively unseal the cartridge.

13. The rapid deployment spill containment tank in accordance with claim 12,
    said inflator including a manual ripcord that causes the cartridge to be unsealed when pulled.

14. The rapid deployment spill containment tank in accordance with claim 13,
    said compressed gas source including an inflation valve connected to the inflatable container,
    said inflation valve supporting the cartridge and inflator on the inflatable container,
    said inflation valve fluidly interconnecting the inflator with the air chamber of the inflatable container.

* * * * *